US006174607B1

(12) United States Patent
Sugita et al.

(10) Patent No.: US 6,174,607 B1
(45) Date of Patent: Jan. 16, 2001

(54) THERMAL TRANSFER RECORDING MEDIUM AND METHOD FOR PREPARING THE SAME

(75) Inventors: Junichiro Sugita; Hideaki Takahashi, both of Tochigi (JP)

(73) Assignee: Sony Chemicals Corp., Tokyo (JP)

( * ) Notice: Under 35 U.S.C. 154(b), the term of this patent shall be extended for 0 days.

(21) Appl. No.: 09/403,499

(22) PCT Filed: Mar. 5, 1999

(86) PCT No.: PCT/JP99/01067

§ 371 Date: Nov. 1, 1999

§ 102(e) Date: Nov. 1, 1999

(87) PCT Pub. No.: WO99/44836

PCT Pub. Date: Sep. 10, 1999

(30) Foreign Application Priority Data

Mar. 6, 1998 (JP) .......................................... 10-73258

(51) Int. Cl.[7] .......................................... B32B 27/00

(52) U.S. Cl. .................. 428/423.1; 427/152; 427/385.5; 428/195; 428/500; 428/913; 428/914

(58) Field of Search .............................. 428/195, 423.1, 428/500, 913, 914; 427/146, 372.2, 384, 385.5

(56) References Cited

U.S. PATENT DOCUMENTS 3,907,974 * 9/1975 Smith .................................. 428/346

FOREIGN PATENT DOCUMENTS 2-38094 2/1990 (JP) .
2-160584 6/1990 (JP) .
3-166993 7/1991 (JP) .

* cited by examiner

*Primary Examiner*—Bruce H. Hess
(74) *Attorney, Agent, or Firm*—Oliff & Berridge, PLC

(57) ABSTRACT

The present invention provides a thermal transfer recording medium, which can transfer images to any type of substrates to generate prints with sufficient oil resistance even when they are used immediately after print operation.

The thermal transfer recording medium of the present invention comprises a release layer and an ink layer in that order formed on a substrate, wherein said ink layer contains at least a colorant (A), a curing agent (B) and a bonding resin (C). Said ink layer is cured on said substrate by heating, for example. Said ink layer contains an isocyanate compound (b) and a vinyl chloride resin (c) capable of reacting with said isocyanate compound.

9 Claims, No Drawings

THERMAL TRANSFER RECORDING MEDIUM AND METHOD FOR PREPARING THE SAME

FIELD OF THE INVENTION

The present invention relates to thermal transfer recording media, particularly to thermal transfer recording media with excellent printing quality and oil resistance.

PRIOR ART

Recently, bar code images have been indispensable for control of circulation and costs in the field of, for example, groceries. The most well known method for generating such bar code images is the thermal transfer recording technique using thermal transfer recording media.

A thermal transfer recording medium generally comprise an ink layer mainly based on a wax having a relatively low melting point or softening point formed on a polyester film, wherein said ink layer is transferred to a sheet such as a label, paper, tag, etc. by heat generated in the thermal head in a printer.

There have previously been demands for the use of labels bearing printed bar code images for controlling containers for oils and chemicals or in manufacturing processes using great quantities of oils and chemicals. However, bar code images for these uses are required to have good oil and chemical resistances, because they are often liable to contamination with oils spilled from containers during handling or splashed during manufacturing processes.

In order to satisfy these demands, some thermal transfer recording media have been proposed. For example, JPA No. H2-38094 describes a transfer sheet formed of a release layer, a protective layer, a colorant layer and an adhesive layer, which involves a curing reaction after transfer to give a transferred image with excellent solvent resistance.

JPA No. H3-166993 describes a thermal transfer sheet obtained by forming a release layer and a protective layer in that order consisting of a resin curable by ionizing radiation, which involves positive irradiation with ionizing radiation after transfer to give a print with excellent solvent resistance.

Our investigation on the above thermal transfer recording media showed that they certainly had succeeded in improving solvent resistance of prints. However, the above prior art examples have the disadvantages that they require means for curing the prints and that the prints can not be used immediately after print operation.

Moreover, any curing step after print operation can not be applied to some kinds of sheets that may be denatured by heating or other means.

JPA No. H2-160584 describes a heat-sensitive transfer recording medium having an ink layer consisting of a colorant, a thermoplastic polyol, and a curing agent, which remarkably improves chemical resistance of images.

Our investigation on said thermal transfer recording medium showed that it certainly had succeeded in improving chemical resistance of images.

However, the curing agent used therein is a so-called aluminium chelate compound such as (ethyl acetoacetate) aluminium-diisopropionate, which had the crucial disadvantage that it readily reacts with moisture in the air or moisture in the solvent used for forming the ink layer to cure the ink, thus failing in continuous application of a long ink layer on said thermal transfer recording medium.

As to the type of oils, neither the above nor other prior art documents have proposed any thermal transfer recording media having a sufficient solvent resistance to highly hygroscopic and non-volatile oils such as brake oils.

In order to solve the above problems of the prior art, the present invention aims to provide a thermal transfer recording medium, which can transfer images to any type of sheets to generate prints with sufficient oil resistance even when they are used immediately after print operation.

Another object of the present invention is to provide a thermal transfer recording medium, which can generate bar code images free from contamination with even highly hygroscopic and non-volatile oils such as brake oils.

Still another object of the present invention is to provide a thermal transfer recording medium wherein the ink layer can stably be prepared over a long length without inducing any sudden reaction.

DISCLOSURE OF THE INVENTION

As a result of our careful studies to solve the above problems, we accomplished the present invention on the basis of the finding that oil resistance of thermal transfer recording media is improved by precuring the ink layer on the substrate (i.e. on the release layer) before transfer.

The present invention based on this finding relates to a thermal transfer recording medium comprising a release layer and an ink layer in that order formed on a substrate, wherein the ink layer contains at least a colorant (A), a curing agent (B) and a bonding resin (C) and the ink layer is cured on the substrate.

The thermal transfer recording medium of the present invention can be prepared by applying a composition for forming a release layer on a substrate, applying a composition for forming an ink layer containing at least a colorant (A), a curing agent (B) and a bonding resin (C) thereon and then performing a curing step at a given temperature.

According to the present invention, thus precured ink layer is not readily mixed with the release layer during transfer to prevent deterioration of solvent resistance of the thermal transfer recording medium and to improve oil resistance.

According to the present invention, any curing step is not necessary after print operation, whereby prints can be used immediately after print operation and images can be printed even on substrates that may be denatured by heating or other means.

The curing step should preferably take place at a temperature not higher than the melting point of the composition for forming a release layer for 12 to 36 hours.

Although a curing step of an ink layer before transfer generally lowers transferability of the ink layer, we were interested in the fact that brake oils are usually alcoholic solvents (for example, polyglycol ether) and found that the use of an ink layer comprising a polyvinyl chloride resin and an isocyanate compound maintains transferability of the ink layer even if it is subjected to a precuring step before transfer.

Namely, the ink layer according to the present invention may contain an isocyanate compound (b) and a vinyl chloride resin (c) capable of reacting with the isocyanate compound.

According to the present invention as described above, printing can take place with relatively low printing energy because the bonding resin (c) is highly adhesive and fast and brittle(The ink is easy to cut.). The images formed on substrates from the ink layer are so resistant that they are free from contamination with brake oils to show sufficient oil resistance.

In addition, this combination of an isocyanate compound and a vinyl chloride resin can continuously form a ink layer for a long time because it does not suddenly begins to set.

On the other hand, we found that an ink layer containing the isocyanate compound and vinyl chloride resin improves oil resistance even if it is not subjected to a precuring step before transfer.

Accordingly, the present invention also relates to a thermal transfer recording medium comprising a release layer and an ink layer in that order formed on a substrate, wherein the ink layer may contain at least a colorant (A), an isocyanate compound (b) and a vinyl chloride resin (c) capable of reacting with the isocyanate compound.

The thermal transfer recording medium here can be prepared by applying a composition for forming a release layer on a substrate, applying a composition for forming an ink layer containing at least a colorant (A), a curing agent (B) and a bonding resin (C) thereon, and then allowing the ink layer to stand at a given temperature for a given period of time (for example, at normal temperatures for 200 hours or more).

In the present invention, the amount of the isocyanate compound (b) added into the ink layer can be in the range from 2 to 60 parts by weight based on 100 parts by weight of the vinyl chloride resin (c) capable of reacting with the isocyanate compound.

THE MOST PREFERRED EMBODIMENTS OF THE INVENTION

Some embodiments of thermal transfer recording media of the present invention will now be explained in detail.

Thermal transfer recording media of the present invention comprise a release layer and an ink layer in that order formed on a substrate, wherein this ink layer contains at least a colorant (A), a curing agent (B), and a bonding resin (C) and the ink layer is cured on the substrate.

The substrate used herein may be one of those used for conventional thermal transfer recording media, preferably including substrates made from papers such as condenser paper or parchment paper and substrates made from plastics such as polyester films, polyvinyl chloride films, polycarbonate films, etc.

From the viewpoints of film strength and heat transfer, the thickness of the substrate is preferably 2–12 $\mu$m, more preferably 3.5–6 $\mu$m.

The release layer of the present invention has the role of improving transferability of the ink layer during thermal transfer and adhering well to the substrate and the ink layer to prevent flaked development of the ink layer during normal state (out of thermal transfer).

Materials for the release layer preferably have a melting point of 60–110° C. when they are formulated into a composition for forming the release layer and include, for example, waxes such as carnauba wax, candelilla wax, rice wax, paraffin wax, polyethylene; or thermoplastic resins such as EVA (ethylene-vinyl acetate copolymers), polyester resins, styrene resins, etc.

The thickness of the release layer may vary with the materials for other components such as the substrate or ink layer, printing conditions, etc., but preferably ranges from 0.2 to 1.5 g/m$^2$ in view of printing energy, coating properties and printing quality.

The ink layer of the present invention contains at least a colorant (A), an isocyanate compound (b), and a vinyl chloride resin (c) capable of reacting with the isocyanate compound (b).

The colorant used herein may be one of those conventionally used for thermal transfer recording media, preferably including carbon black and color pigments such as Carmine B (magenta), Yellow GL (yellow), Blue 4040 (cyan), Orange G (orange), etc.

Said colorant may be used in the range from 5 to 70 parts by weight, preferably 40 to 60 parts by weight based on 100 parts by weight of the components in the ink layer in view of transferability of the ink layer.

The isocyanate compound used herein may be one of those widely used as curing agents, specifically diisocyanates such as tolylene diisocyanate, 4,4'-diphenylmethane diisocyanate, xylylene diisocyanate, hexamethylene diisocyanate, 4,4'-diphenylmethane diisocyanate hydroxide, isophorone diisocyanate, trimethylhexamethylene diisocyanate; or adducts of these diisocyanates.

In the present invention, a vinyl chloride resin reacting with said isocyanate compound is used. In order to react with the isocyanate compound, the vinyl chloride resin may have a functional group such as a hydroxyl, amino, carboxyl or the like group in its backbone or side chain.

The vinyl chloride resin used herein may be commercially available, including vinyl chloride resins designated by trade names such as MR110, MR112, MR113, MR104 available from Nippon Zeon.

Said isocyanate compound may be added in the proportion of 5–60 parts by weight, more preferably 10–20 parts by weight based on 100 parts by weight of said vinyl chloride resin.

If the amount of the isocyanate compound added is less than 5 parts by weight, the effects of the present invention can not be sufficiently achieved. However, transferability may be affected in some printing conditions if the amount exceeds 60 parts by weight.

The ink layer of the present invention may contain other resins for improving printing quality without departing the purpose of the present invention. Such resins include, for example, polyester resins, polyamide resins, acrylic resins, epoxy resins, urethane resins, etc.

The thickness of the ink layer of the present invention having such a structure is 0.5 g/m$^2$–2.5 g/m$^2$.

According to the present invention, a heat-resistant lubricant layer may be formed from a known silicone copolymer or silicone oil on the side of the substrate opposite to the side on which the ink layer is formed, in order to enhance running properties of the thermal transfer recording medium.

The thickness of the heat-resistant lubricant layer is preferably 0.1 g/m$^2$–0.5 g/m$^2$ in view of performance as a lubricant layer and prevention of adhesion to the ink layer after the medium is rolled up.

Thermal transfer recording media of the present invention can be prepared according to conventional methods. Namely, a composition for forming a release layer is formed on a substrate by gravure coating or the like, and then a composition for forming an ink layer is formed thereon by gravure coating or the like.

However, thermal transfer recording media of the present invention involve a curing step of said ink layer after said ink layer has been formed.

The curing step of the ink layer here should take place at a temperature not higher than the melting point of the composition for forming a release layer to avoid softening of the release layer, specifically in a temperature range of 40–50° C. for about 12–36 hours. This allows the ink layer to be almost completely cured.

Even when thermal transfer recording media are not immediately used, the ink layer can be sufficiently cured by allowing it to stand at normal temperatures (20±5° C.) for 200 hours or more after it has been formed.

The following examples further illustrate thermal transfer recording media of the present invention in contrast to comparative examples.

EXAMPLE 1

Preparation of a Composition for Forming a Heat-resistant Lubricant Layer

The following materials were dissolved in 98 parts by weight of M.E.K. (methyl ethyl ketone) as a solvent to prepare a desired composition for forming a heat-resistant lubricant layer.

| | |
|---|---|
| Acrylic-modified Silicone resin (Symac 308 available from Toagosei) | 1.3 parts by weight |
| Diisocyanate adduct (D110 available from Takeda Chemical Industries) | 0.7 parts by weight |

Preparation of a Composition for Forming a Release Layer

The following materials were dissolved in 90 parts by weight of heated toluene as a solvent to prepare a desired composition for forming a release layer.

| | |
|---|---|
| Ester wax (OP wax available from Hoechst AG) | 9 parts by weight |
| Ethylene-vinyl acetate copolymer (KA-31 available from Sumitomo Chemical) | 1 part by weight |

This composition for forming a release layer had a melting point of about 95° C.

Preparation of a Composition for Forming an Ink Layer

The following materials were dissolved in 80 parts by weight of M.E.K. as a solvent to prepare a desired composition for forming an ink layer.

| | |
|---|---|
| Vinyl chloride copolymer resin (MR110 available from Nippon Zeon) | 8.0 parts by weight |
| Isocyanate adduct (D110 available from Takeda Chemical Industries) | 0.16 parts by weight |
| Carbon black (Regal 660 available from Cabot) | 12.0 part by weight |

Said vinyl chloride copolymer resin contains about 0.6% of a copolymer unit having a hydroxyl group (—OH).

Preparation of a Thermal Transfer Recording Medium

Said composition for forming a heat-resistant lubricant layer was used to form a heat-resistant lubricant layer on one face (back surface) of a polyester film (F5 available from Teijin) having a thickness of 4.6 μm by gravure coating, after which the solvent was evaporated.

Then, said composition for forming a release layer was used to form a release layer on the other face (front surface) of said polyester film by gravure coating, after which the solvent was evaporated.

Then, said composition for forming an ink layer was used to form an ink layer on said release layer by gravure coating and the solvent was evaporated, followed by a curing step at a temperature of 50° C. for 24 hours to give a desired thermal transfer recording medium.

The thickness of each layer is 0.1 $g/m^2$ for the heat-resistant lubricant layer, 1.0 $g/m^2$ for the release layer and 1.0 $g/m^2$ for the ink layer.

Evaluations

Said thermal transfer recording medium was evaluated for the following evaluation aspects. The results are shown in Table 1.

TABLE 1

| Thermal transfer recording media of Examples and Comparative examples | Composition for forming an ink layer: Bonding resin (parts by weight) | Composition for forming an ink layer: Isocyanate (parts by weight) | Composition for forming an ink layer: Carbon black (parts by weight) | Curing on the substrate | Evaluation aspects: printing quality | Evaluation aspects: Resistance to brake oils |
|---|---|---|---|---|---|---|
| Example 1 | 8.0 | 0.16 | 12.0 | 50° C., 24 hours | ○ | ○ (35) |
| Example 2 | 8.0 | 0.40 | 12.0 | 50° C., 24 hours | ○ | ○ (45) |
| Example 3 | 8.0 | 0.80 | 12.0 | 50° C., 24 hours | ○ | ◎ (70) |
| Example 4 | 8.0 | 1.60 | 12.0 | 50° C., 24 hours | ○ | ◎ (65) |
| Example 5 | 8.0 | 2.40 | 12.0 | 50° C., 24 hours | Δ | ◎ (80) |
| Example 6 | 8.0 | 4.00 | 12.0 | 50° C., 24 hours | Δ | ◎ (100) |
| Example 7 | 8.0*1 | 1.60 | 16.0 | 50° C., 24 hours | Δ | ○ (17) |
| Example 8 | 8.0*2 | 1.60 | 20.0 | 50° C., 24 hours | ○ | ○ (15) |
| Example 9 | 8.0 | 1.60 | 12.0 | None | ○ | ○ (12) |

TABLE 1-continued

| Thermal transfer recording media of Examples and Comparative examples | Composition for forming an ink layer: Bonding resin (parts by weight) | Isocyanate (parts by weight) | Carbon black (parts by weight) | Curing on the substrate | Evaluation aspects: printing quality | Resistance to brake oils |
|---|---|---|---|---|---|---|
| Comparative Example 1 | 8.0*[1] | 1.60 | 16.0 | None | ○ | X (3) |
| Comparative Example 2 | 8.0*[2] | 1.60 | 20.0 | None | ○ | X (4) |

Notes for bonding resins
Unmarked: Vinyl chioride resin (MR110 available from Nippon Zeon)
*[1]Polyester resin (UE3350 available from Unichika)
*[2]Polyurethane resin (PRH115 available from Nippon Polyurethane)

1. Printing quality

Using a thermal transfer printer (ZEBRA-140Xi, available from Zebra Technologies), a bar code image was formed on a PET (polyethylene terephthalate) label (Select 21830 available from FLEXCON) at a printing speed of 2 in. (5.08 cm)/sec.

This print was visually observed for missing spots.

Evaluation standards are as follows. ○: The print shows favorable printing quality with no missing spots; Δ: The print shows some missing spots, but without inconvenience for practical use; X: The print shows too many missing spots for practical use.

2. Resistance to brake oils

Said label was applied on a movable platen of a color fastness tester with the bar code image just having been printed on said label facing upward and a weight having a weight of 400 g/cm$^2$ wrapped in a cloth wetted with a brake oil (polyethylene glycol ether) was put thereon, and then the platen was laterally oscillated to rub the surface of the bar code image and count the number of cycles of the platen until this bar code image became contaminated.

Evaluation standards here are as follows. ⊚: Especially excellent solvent resistance with 31 cycles or more; ○: Excellent solvent resistance with 12–30 cycles; X: Unsuitable for practical use with 11 cycles or less.

Results

Table 1 shows that the thermal transfer recording medium of Example 1 had excellent printing quality and remained uncontaminated with the brake oil until 35 cycles.

EXAMPLES 2–6

In Examples 2–6, thermal transfer recording media were prepared by the same procedure as in Example 1 except that the weight parts of the isocyanate compound used in Example 1 were changed. These thermal transfer recording media were evaluated by the methods described above. The results are shown in Table 1.

Results

Table 1 shows that the thermal transfer recording media of Examples 2–6 were excellent in both of printing quality and resistance to brake oils.

Especially, the thermal transfer recording media of Examples 3 and 4 containing 10–20 parts by weight of the isocyanate compound based on 100 parts by weight of the vinyl chloride resin were found to be the most preferred embodiments of the present invention with good printing quality and resistance to brake oils.

EXAMPLES 7 AND 8

In Examples 7 and 8, thermal transfer recording media were prepared by the same procedure as in Example 4 except that the vinyl chloride resin in Example 4 was replaced by a polyester resin or a urethane resin (with somewhat larger amount of carbon black) . These thermal transfer recording media were evaluated by the methods described above. The results are shown in Table 1.

Results

Table 1 shows that the thermal transfer recording media of Examples 7 and 8 were somewhat poor in resistance to brake oils but remained at a practically acceptable level with good printing quality.

EXAMPLE 9

In Example 9, a thermal transfer recording medium was prepared by the same procedure as in Example 4 except that the curing step on the substrate in Example 4 was omitted. This thermal transfer recording medium was evaluated by the methods described above. The results are shown in Table 1.

Results

Table 1 shows that the thermal transfer recording medium of Example 9 was somewhat poor in resistance to brake oils but remained at a practically acceptable level with good printing quality.

Comparative Examples 1 and 2

In Comparative examples 1 and 2, thermal transfer recording media were prepared by the same procedure as in Examples 7 and 8 except that the curing step on the substrate in Examples 7 and 8 was omitted. These thermal transfer recording media were evaluated by the methods described above. The results are shown in Table 1.

Results

Table 1 shows that the thermal transfer recording media of Comparative examples 1 and 2 had good printing quality but extremely low resistance to brake oils and were unsuitable-for practical use.

Industrial Applicabilities

The foregoing description demonstrates that thermal transfer recording media of the present invention are useful as those capable of transferring images to any type of substrates with good solvent resistance, and especially suitable for improving resistance to brake oils and printing quality of thermal transfer recording media.

What is claimed is:

1. A thermal transfer recording medium comprising a release layer and an ink layer in that order formed on a substrate, wherein said ink layer contains at least a colorant (A), a curing agent (B) and a bonding resin (C), wherein said curing agent (B) comprises an isocyanate compound (b) and said bonding resin (C) comprises a vinyl chloride resin (c) capable of reacting with said isocyanate compound (b), wherein said ink layer is cured on said substrate.

2. A thermal transfer recording medium according to claim 1 wherein the amount of said isocyanate compound (b) added into said ink layer ranges from 2 to 60 parts by weight based on 100 parts by weight of said vinyl chloride resin (c) capable of reacting with said isocyanate compound.

3. A thermal transfer recording medium comprising a release layer and an ink layer in that order formed on a substrate, wherein said ink layer contains at least a colorant (A), an isocyanate compound (b) and a vinyl chloride resin (c) capable of reacting with said isocyanate compound.

4. A thermal transfer recording medium according to claim 3 wherein the amount of said isocyanate compound (b) added into said ink layer ranges from 2 to 60 parts by weight based on 100 parts by weight of said vinyl chloride resin (c) capable of reacting with said isocyanate compound.

5. A process for preparing a thermal transfer recording medium, comprising applying a composition for forming a release layer on a substrate, applying thereon a composition for forming an ink layer containing at least a colorant (A), a curing agent (B) and a bonding resin (C), wherein said curing agent (B) comprises an isocyanate compound (b) and said bonding resin (C) comprises a vinyl chloride resin (c) capable of reacting with said isocyanate compound (b), and then performing a curing step at a given temperature.

6. A process according to claim 5 wherein said curing step takes place at a temperature not higher than the melting point of said composition for forming a release layer for 12 to 36 hours.

7. A process according to claim 5, wherein said ink layer is cured on said substrate during said curing step.

8. A process for preparing a thermal transfer recording medium, comprising applying a composition for forming a release layer on a substrate, applying thereon a composition for forming an ink layer containing at least a colorant (A), a curing agent (B) and a bonding resin (C), wherein said curing agent (B) comprises an isocyanate compound (b) and said bonding resin (C) comprises a vinyl chloride resin (c) capable of reacting with said isocyanate compound (b), and then allowing the ink layer to stand at a given temperature for a given period of time.

9. A process according to claim 8, comprising allowing the ink layer to stand at normal temperatures for 200 hours or more after it has been formed.

* * * * *